(12) United States Patent
Hsu et al.

(10) Patent No.: US 7,010,707 B2
(45) Date of Patent: Mar. 7, 2006

(54) PHYSICAL LAYER DEVICE WITH OUTPUT BUFFER FOR LINK PULSE GENERATOR CONNECTED TO CASCADED POWER SUB-CIRCUTS THAT RECEIVE A SERIES OF DISABLING SIGNALS

(75) Inventors: Ming-Hsun Hsu, Taipei (TW);
Chien-Cheng Chang, Taipei (TW);
Yu-En Tzeng, Taipei (TW)

(73) Assignee: VIA Technologies, Inc., Taipei (TW)

( * ) Notice: Subject to any disclaimer, the term of this patent is extended or adjusted under 35 U.S.C. 154(b) by 580 days.

(21) Appl. No.: 10/223,274

(22) Filed: Aug. 19, 2002

(65) Prior Publication Data
US 2003/0115492 A1    Jun. 19, 2003

(30) Foreign Application Priority Data
Dec. 13, 2001   (TW) ................................. 90130950

(51) Int. Cl.
*G06F 1/26*       (2006.01)
(52) U.S. Cl. .......................... 713/320; 326/26; 370/419
(58) Field of Classification Search ................. 426/26;
370/419; 713/320
See application file for complete search history.

(56) References Cited

U.S. PATENT DOCUMENTS

| | | | | | |
|---|---|---|---|---|---|
| 5,632,019 | A | * | 5/1997 | Masiewicz | 713/300 |
| 5,907,553 | A | * | 5/1999 | Kelly et al. | 370/433 |
| 5,923,183 | A | * | 7/1999 | Kim et al. | 326/27 |
| 6,795,450 | B1 | * | 9/2004 | Mills et al. | 370/463 |

* cited by examiner

*Primary Examiner*—Thomas Lee
*Assistant Examiner*—Albert Wang
(74) *Attorney, Agent, or Firm*—Madson & Metcalf

(57) ABSTRACT

A method for saving electrical power for a physical layer (PHY) device including a plurality of sub-circuits is disclosed. The method includes the steps of outputting a plurality of link pulses, asserting a plurality of disabling signals between two adjacent link pulses for disabling the sub-circuits, respectively, and deasserting the disabling signals for enabling the sub-circuits, respectively. The disabling signals are asserted separately for disabling the sub-circuits at different time points. A physical layer device for use in a chip for saving electrical power is also disclosed.

10 Claims, 4 Drawing Sheets

PHYSICAL LAYER DEVICE WITH OUTPUT BUFFER FOR LINK PULSE GENERATOR CONNECTED TO CASCADED POWER SUB-CIRCUTS THAT RECEIVE A SERIES OF DISABLING SIGNALS

FIELD OF THE INVENTION

The present invention relates to a method for saving electrical power for a physical layer device, and more particularly to a method for saving electrical power for a plurality of physical layers in a network device. The present invention also relates to a physical layer device including a plurality of sub-circuits for saving electrical power.

BACKGROUND OF THE INVENTION

In a network device such as hub, switch controller, Network Interface Card (NIC), etc., a physical layer device for transmitting and/or receiving signals is required.

For example, Ethernet switch controller including a plurality of physical layer devices can simultaneously provide a plurality of ports for connecting to cables. When the interface transmission rates between two network devices are different, e.g. the interface transmission rates may vary from 10 BASE-T (10 MHz) to 100 BASE-T (100 MHz) and further to 1000 BASE-T (GHz), a link pulse such as a normal link pulse or a fast link pulse can be used for networking. After link proceeds, both network devices utilize a proper encoded signal, e.g. MLT-3, to proceed a differential transmission.

Although Ethernet switch controller provides a plurality of ports for connecting to cables, some of the ports may be in an unused status. That is, corresponding physical layer devices of some ports may be unlinked or dumbly link without data transmission therebetween. However, these corresponding physical layer devices still keep outputting the link pulses to inform the remote network device. For example, as shown in FIG. 1, the unused physical layer devices keep outputting a link pulse of 100 ns in width every 16±8 ms. Furthermore, because the transmission signal is transmitted in a differential transmission manner, the physical layer devices, even in an unused status, also consume significant common mode bias current.

Therefore, the present invention discloses how to save electrical power for a physical layer device and a new physical layer device structure to deal with the above situations encountered in the prior art.

SUMMARY OF THE INVENTION

An object of the present invention is to provide a method and a device for saving electrical power for a physical layer device.

Another object of the present invention is to provide a method and a device for saving electrical power for a physical layer device for efficiently reducing the noise of ground bounce.

According to an aspect of the present invention, there is provided a method for saving electrical power for a physical layer (PHY) device including a plurality of sub-circuits. The method includes the steps of outputting a plurality of link pulses, asserting a plurality of disabling signals between two adjacent link pulses for disabling the sub-circuits, respectively, and deasserting the disabling signals for enabling the sub-circuits, respectively. The disabling signals are asserted separately for disabling the sub-circuits at different time points.

For example, the link pulses can be normal link pulses or fast link pulses.

Preferably, the disabling signals are deasserted separately for re-enabling the sub-circuits at different time points.

Preferably, the two adjacent link pulses includes a first link pulse and a second link pulse, the first link pulse leads the second link pulse, and there are a first guard period and a second guard period between the first link pulse and the second link pulse. Preferably, the earliest one of the disabling signals is not asserted until the first guard period which follows the first link pulse is up. In addition, the last one of the disabling signals is preferably deasserted prior to the second guard period which leads the second link pulse.

According to another aspect of the present invention, a method is provided for saving electrical power for a physical layer (PHY) device. The method includes the steps of outputting a plurality of link pulses, asserting a disabling signal between two adjacent link pulses to disable the physical layer device, and deasserting the disabling signal to enable the physical layer device.

According to a further aspect of the present invention, a physical layer (PHY) device for use in a chip includes a link pulse generator generating a series of link pulses; an output buffer electrically connected to the link pulse generator for receiving and then outputting the link pulses; a power source circuit electrically connected to the output buffer for providing power for the output buffer; and a disabling signal generator electrically connected to the link pulse generator and the power source circuit for detecting the link pulses, and asserting a disabling signal to disable the power source circuit after the generation of a preceding one of the link pulses, and deasserting the disabling signal to enable the power source circuit before the generation of a following one of the link pulses.

According to a further aspect of the present invention, a physical layer (PHY) device embedded in a network chip includes a link pulse generator generating a series of link pulses; an output buffer electrically connected to the link pulse generator for receiving and then outputting either of data or the link pulses; a power source circuit electrically connected to the output buffer and comprising a plurality of sub-circuits cooperating to provide power for the output buffer; and a disabling signal generator electrically connected to the link pulse generator and the sub-circuits of the power source circuit for detecting the link pulses, and asserting a series of disabling signals to disable the sub-circuits after the generation of a preceding one of the link pulses, and deasserting the disabling signals to enable the sub-circuits before the generation of a following one of the link pulses. The output of the data or the link pulses is selected by a multiplexer in response to a selection signal.

Preferably, the disabling signals are asserted and deasserted at different time points.

In accordance with the present invention, each of the sub-circuits includes a controlled current source coupled with the disabling signal generator to be controlled by one of the disabling signals.

In an embodiment, the disabling signal generator includes a timer electrically connected to the link pulse generator, counting a first predetermined time period in response to the generation of the preceding one of the link pulses to assert a first one of the disabling signals, and counting a second predetermined time period to deassert the first one of the disabling signals; and a plurality of delay elements electrically connected to the timer and the sub-circuits of the current source circuit for sequentially asserting and deasserting the following ones of the disabling signals therevia in response to the assertion and deassertion of the first one of the disabling signals, respectively. The last one of the disabling signals is preferably deasserted before a third predetermined time period ahead of the following one of the link pulses.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the preferred embodiments. It is to be noted that the following descriptions of a preferred embodiment of this invention are presented herein for purpose of illustration and description only; it is not intended to be exhaustive or to be limited to the precise form disclosed.

Figure 1:
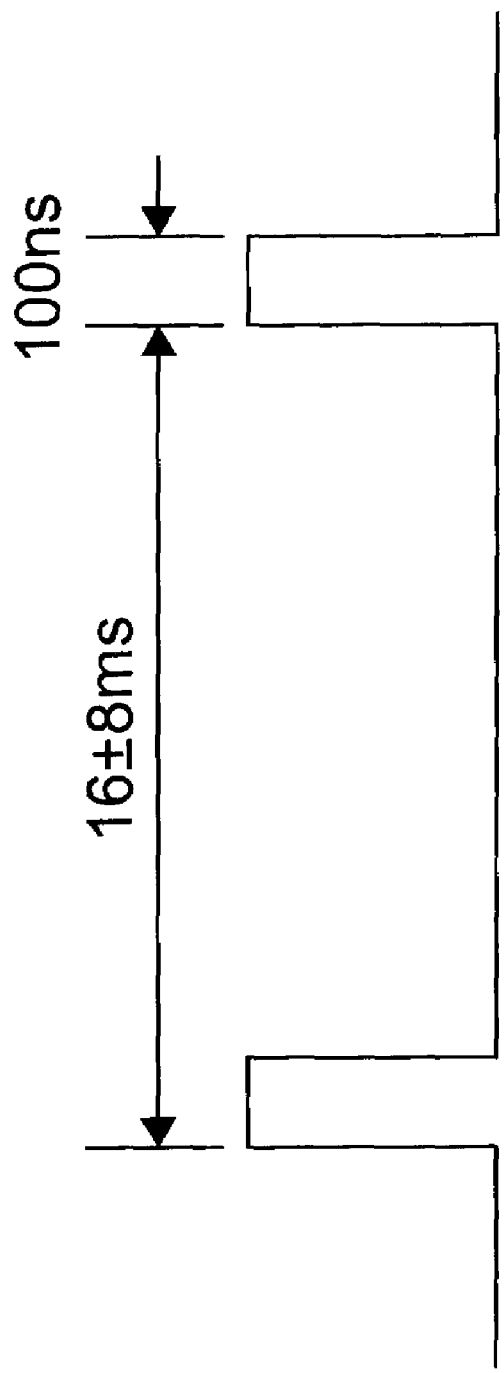
FIG. 1 is a schematic waveform diagram illustrating link pulses outputted for informing the remote network device of the presence thereof.
Figure 2:
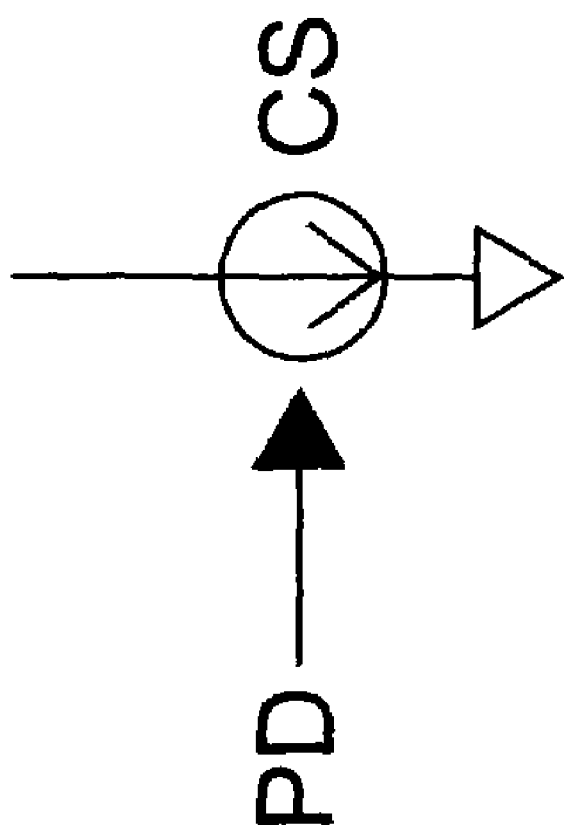
FIG. 2 is a schematic diagram illustrating the timely disabling of the current source to achieve a power-saving function according to the present invention.

In order to reduce the power consumption, it is preferred that a disabling signal PD be asserted between two adjacent link pulses to disable the controlled current source CS during the pulse-free period, referring to FIG. 2. The link pulses may be normal link pulses or fast link pulses.

Figure 3:
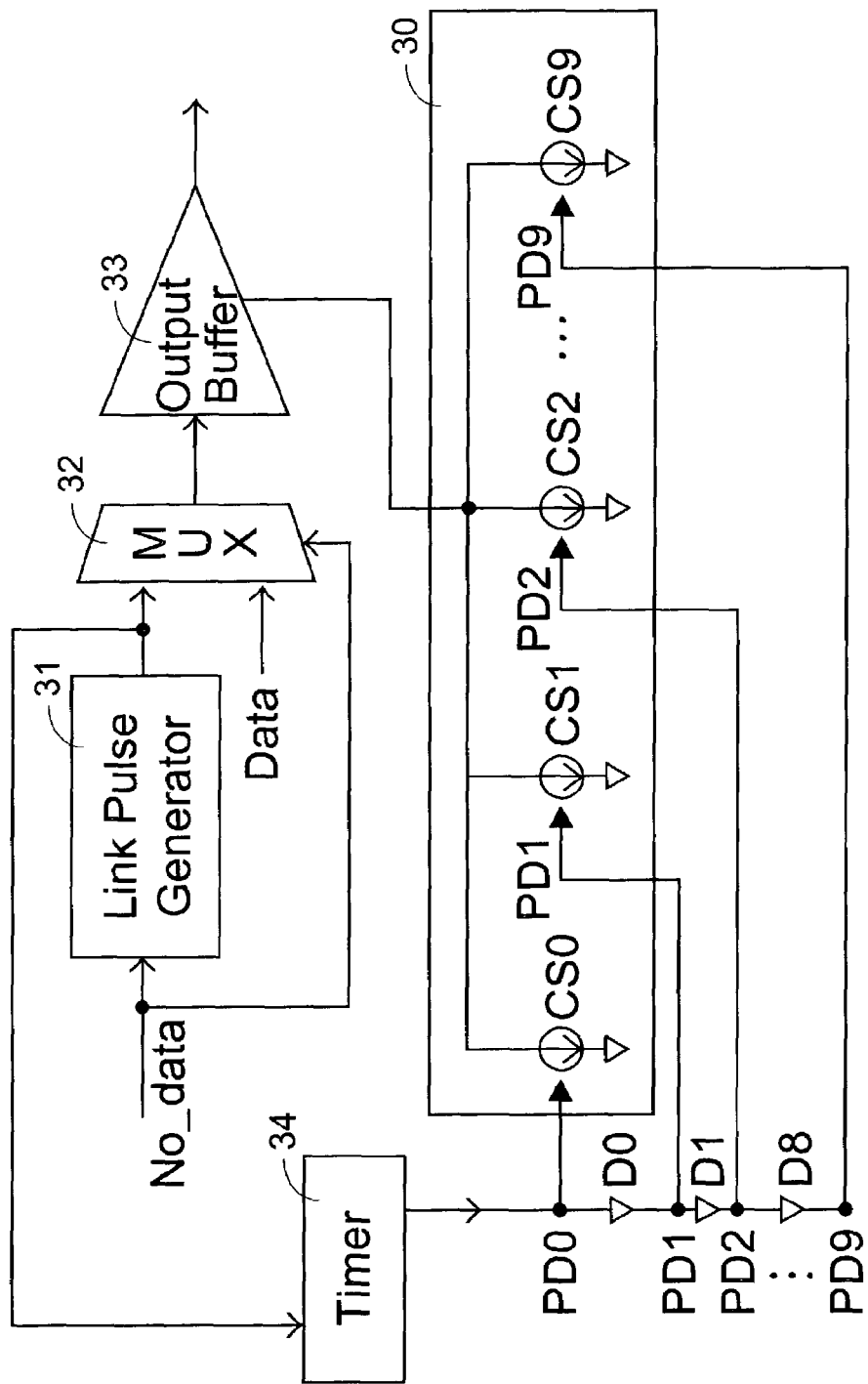
FIG. 3 is a schematic diagram illustrating a preferred embodiment of a physical layer device according to the present invention.

Please refer to FIG. 3 which is a schematic functional diagram showing a preferred embodiment of a physical layer device according to the present invention. The physical layer device includes a controlled current source 30, a link pulse generator 31, a multiplexer 32, an output buffer 33, a timer 34 and a plurality of delay elements D0~D8. During the suspension period of the data transmission, the multiplexer 32 allows the link pulse generator 31 to output link pulses via the output buffer 33 to inform the remote network device (not shown) according to the NO_Data signal. The link pulses are also fed to the timer 34 to determine when to start asserting the disabling signal PD0 to in turn deactivate the controlled current source 30 in order to save power.

Figure 4:
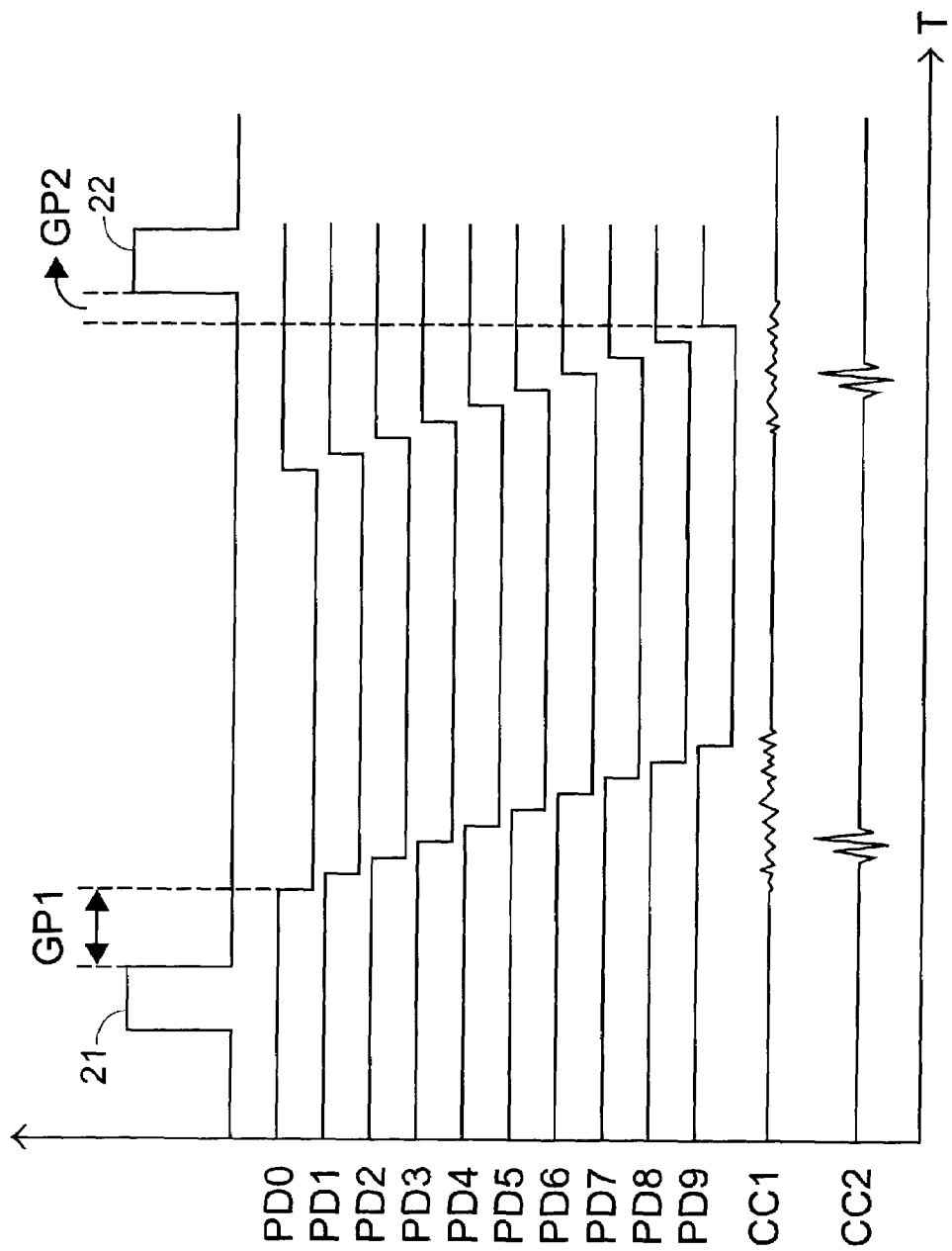
FIG. 4 is a schematic waveform diagram illustrating the assertion and deassertion of the disabling signals between two adjacent link pulses, and the possible ground bounce noises.

Referring to FIG. 4, if the controlled current source 30 is totally switched off after the generation of a leading link pulse 21, and then totally switched on before the generation of the following link pulse 22, a relatively large ground bounce would be rendered as shown by the waveform CC2 due to the instantaneous and significant change of consumed current. Therefore, the present invention divides the controlled current source 30 into several sub-circuits, e.g. CS0~CS9 (FIG. 3), at a design stage and disables the sub-circuits at different time points between two adjacent link pulses. For example, if the total current consumption for the physical layer device is 100 mA, then each of the sub-circuits CS0~CS9 is responsible for 10 mA.

Please refer to FIGS. 3 and 4 again. Between the two adjacent link pulses 21 and 22, ten disabling signals PD0~PD9 are provided for controlling the switching (on/off) timings of the ten sub-circuits CS0~CS9. It is understood that the number of the sub-circuits and corresponding disabling signals is not limited, and can be adjusted according to the practical needs. Timer 34 can generate a predetermined delay in response to the link pulses from the link pulse generator 31. The ten disabling signals PD0~PD9 are properly phase-shifted by way of nine delay elements D0~D8. After a leading link pulse 21 is outputted by the link pulse generator 31, ten disabling signals PD0~PD9 are sequentially asserted via the timer 34 and the delay elements D0~D8 are respectively coupled with the sub-circuits CS0~CS9 so as to disable sub-circuits CS0~CS9 one by one for the output buffer 33. Then, the ten disabling signals PD0~PD9 are sequentially deasserted before the following link pulse 22 to actuate the sub-circuits CS0~CS9 one by one for the output buffer 33. By asserting and deasserting the disabling signals at different time points, the level of the consumed current is gradually changed. Therefore, the ground bounce resulting from the assertion/deassertion of those disabling signals PD0~PD9 will be the waveform CC1 of less fluctuation, as shown in FIG. 4.

Apparently, if the time points for asserting or deasserting the disabling signals PD0~PD9 are properly phase shifted by the delay elements D0~D8, the transient change of current consumption is effectively reduced, and the noise of the ground bounce is also reduced. This phenomenon can be explained by the equation $\Delta V = L \times di/dt$, wherein $\Delta V$, L and (di/dt) represent the voltage change, the inductance and the current change per time unit, respectively. For example, when the inductance is 10 nano-hanry (nH), the required current is 100 mA and the current is cut off in 1ns, if all current supplies are simultaneously shut down, then the ground bounce noise is: $\Delta V = L \times (di/dt) = 10$ nH$\times(100$ mA/1 ns$)=1V$. Accordingly, the amplitude of the voltage change of the ground bounce noise goes up to 1V. On the contrary, when the assertions or deassertions of the disabling signals PD0~PD9 are phase-shifted according to the above embodiment, the sub-circuits CS0~CS9 are enabled or disabled sequentially. Hence, the amplitude of voltage change can be efficiently reduced to 0.1V.

In addition, in order not to interfere with the link pulses, all the disabling signals are preferably asserted after a guard period GP1 counted by the timer 34 from the falling edge of the leading link pulse 21, held for a predetermined period, and then deasserted a guard period GP2 ahead of the rising edge of the following link pulse 22. The first guard period GP1 ensures that the link pulse 21 is completed. The second guard period GP2 is for assuring that the physical layer device has enough time to actuate the link pulse 22. By this way, the physical layer device can safely output the link pulses to inform the remote network device all the time.

The above-mentioned features are especially prominent for a network device including a plurality of physical layer device. For example, in a switch controller chip integrated with eight physical layer devices, hundred millions of digital elements in addition to the eight physical layer devices have to be disposed in a limited area for providing eight transceiving ports. Apparently, the signals are subject to affection by one another. The ground bounce occurring due to voltage change is thus a significant issue. Therefore, the present invention achieves the power-saving purpose for the physical layer devices by timely asserting the disabling signals PD0~PD9. In addition, the transient change of current consumption is reduced by phase-shifting the assertions or deassertions of all disabling signals PD0~PD9, thereby efficiently reducing ground bounce.

It is understood that for further reducing the amplitude of ground bounce noise, the physical layer device can be designed to include a plurality of sub-circuits, which are preferably power source supplies activated or deactivated by corresponding disabling signals at different proper time points.

To sum up, the present invention provides a method and a physical layer device for largely saving the electrical power for the physical layer device by asserting the disabling signals between two adjacent link pulses. Furthermore, the ground bounce can be efficiently reduced by properly phase-shifting the assertions of the disabling signals as well as the desertions. The reduction of ground bounce is especially important for embedded physical layers, for example, a plurality of ports in a network device. Therefore, the present invention can reduce the electrical power consumption for the physical layer device without affecting the performance of the other physical layer devices.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A physical layer (PHY) device for use in a chip, comprising:
   a link pulse generator generating a series of link pulses;
   an output buffer electrically connected to said link pulse generator for receiving and then outputting either of data or said link pulses;
   a power source circuit electrically connected to said output buffer and comprising a plurality of sub-circuits cooperating to provide power for said output buffer; and
   a disabling signal generator electrically connected to said link pulse generator and said sub-circuits of said power source circuit for detecting said link pulses, and asserting a series of disabling signals to disable said sub-circuits after the generation of a preceding one of said link pulses, and deasserting said disabling signals to enable said sub-circuits before the generation of a following one of said link pulses.

2. The physical layer device according to claim 1 wherein said disabling signals are asserted and deasserted at different time points.

3. The physical layer device according to claim 1 wherein each of said sub-circuits includes a controlled current source coupled with said disabling signal generator to be controlled by one of said disabling signals.

4. The physical layer device according to claim 1 wherein said disabling signal generator includes:
   a timer electrically connected to said link pulse generator, counting a first predetermined time period in response to the generation of said preceding one of said link pulses to assert a first one of said disabling signals, and counting a second predetermined time period to deassert said first one of said disabling signals; and
   a plurality of delay elements electrically connected to said timer and said sub-circuits of said current source circuit for sequentially asserting and deasserting the following ones of said disabling signals therevia in response to the assertion and deassertion of said first one of said disabling signals, respectively.

5. The physical layer device according to claim 1 wherein said link pulses are normal link pulses or fast link pulses.

6. The physical layer device according to claim 1 wherein said physical layer device transmits and receives a differential signal.

7. The physical layer device according to claim 1 wherein said chip is one selected from a group consisting of a switch controller chip, a hub controller chip and a network controller chip.

8. The physical layer according to claim 1 wherein the last one of said disabling signals is deasserted before a third predetermined time period ahead of said following one of said link pulses.

9. The physical layer according to claim 1 further comprising a multiplexer electrically connected to said link pulse generator, a data input end and said output buffer for selecting one of said data and said link pulses to be outputted to said output buffer in response to a selection signal.

10. The physical layer according to claim 9 wherein said selection signal is in a specified status to select said data to be outputted by said multiplexer in condition of the presence of data.

* * * * *